United States Patent [19]

Billiet

[11] Patent Number: 4,795,598
[45] Date of Patent: Jan. 3, 1989

[54] METHOD OF MAKING ARTICLES FROM SINTERABLE MATERIALS

[75] Inventor: Romain L. Billiet, Singapore, Singapore

[73] Assignee: Solid Micron Materials, Pte, Ltd., Singapore, Singapore

[21] Appl. No.: 2,782

[22] Filed: Jan. 13, 1987

[30] Foreign Application Priority Data

Dec. 5, 1986 [GB] United Kingdom ............... 8629185

[51] Int. Cl.4 .................... B29C 71/02; C04B 35/64; B22F 1/00; G01N 25/20
[52] U.S. Cl. .................................. 264/40.6; 264/63; 264/344; 419/36; 419/65
[58] Field of Search ................. 264/40.1, 40.6, 63, 264/344; 419/36, 37, 44, 53, 54, 63, 65; 432/13, 18

[56] References Cited

U.S. PATENT DOCUMENTS

| | | | |
|---|---|---|---|
| 2,203,895 | 6/1940 | Davis et al. | 419/44 |
| 2,939,199 | 6/1960 | Strivens | 25/156 |
| 3,266,893 | 8/1966 | Duddy | 75/222 |
| 3,871,630 | 3/1975 | Wanetzky et al. | 266/20 |
| 3,901,742 | 8/1975 | Facaros | 148/105 |
| 3,932,310 | 1/1976 | Turner | 264/65 |
| 4,011,291 | 3/1977 | Curry | 264/43 |
| 4,144,207 | 3/1979 | Ohnsorg | 260/23 |
| 4,197,118 | 4/1980 | Wiech, Jr. | 75/228 |
| 4,247,500 | 1/1981 | Dixon et al. | 264/63 |
| 4,271,106 | 6/1981 | Grolean | 264/40.6 |
| 4,305,756 | 12/1981 | Wiech, Jr. | 75/211 |
| 4,404,166 | 9/1983 | Wiech, Jr. | 419/36 |
| 4,534,936 | 8/1985 | Carlstrom et al. | 419/36 |
| 4,661,315 | 3/1987 | Wiech, Jr. | 264/63 |

FOREIGN PATENT DOCUMENTS 779242 7/1957 United Kingdom .

Primary Examiner—Ivars Cintins
Assistant Examiner—Linda S. Evans
Attorney, Agent, or Firm—Thomas Schneck

[57] ABSTRACT

A method of binder removal from a green body before sintering or the like wherein the binder is constituted of a polymeric material or mixture which is degradable by thermo-oxidation and the green body is initially heated to a temperature where the binder reaches an energy level above the activation energy of the binder, as a result of which exothermic degradation reactions are initiated at the binder-atmosphere interface. The rate of the exothermic reaction is controlled by the rate of supply of thermal energy and oxygen to the reaction site as well as the rate of evacuation of the heat of reaction generated during the thermal oxidation. Substantially all of the binder is thus removed from the green body which can then be sintered in accordance with the practices of the prior art.

19 Claims, 1 Drawing Sheet

METHOD OF MAKING ARTICLES FROM SINTERABLE MATERIALS

TECHNICAL FIELD

The present invention relates to methods for making articles from sinterable compacted or molded particles and particularly to methods for the removal of organic binders from such articles during manufacture.

BACKGROUND ART

The method of forming shaped articles from particulate materials is well known in the art. Classically, a desired particulate material is mixed with a fugitive binder and then formed into the desired configuration, this frequently being called the green body. After the forming of the shaped article by any of the methods of the prior art, it is necessary to remove the binder before the green body can be sintered. This procedure is very critical and usually very time consuming which introduces great constraints on the physical and economical viability of the process.

A major drawback with prior art methods is the need for unusual, impractical, uneconomic or unsafe conditions such as vacuum or solvent atmospheres, packing or placement of the articles in or upon absorptive materials, pressurization of the processing vessel, the need for complex multiple thermoplastic binder components with increasing melting points, the generation of internal pressures from gaseous decomposition products and/or the swelling of solvent-binder combinations which tend to disrupt the integrity of the green body and therefore requires extremely flat temperature profiles, the possibility of violent exothermic reactions within the binder which may rapidly destroy the green body and which, in addition, represent a serious danger to the processing equipment, its operators and the environment in general.

In U.S. Pat. No. 4,534,936, Carlstrom et al. recognize the heterogeneity and/or autogeneity of the decomposition reactions of polymeric binding agents. The patent teaches reduction of the time dependence of the reactions by subjecting the rate of temperature rise to a constant arbitrarily or empirically predetermined mass-time derivative, and has therefore achieved a significant reduction in extraction time. The method nevertheless is not thermo-dynamically optimized and furthermore introduces practical problems in the need for accurate initial determination of the net relative mass (weight) of binder in each processing batch, and the incorporation and exposure of sensitive and delicate gravimetric balances to the damaging environment of the ovens or furnaces.

Commonly used organic binders for molding of metal and ceramic particulates generally include various polymeric ingredients, either thermoplastic or thermosetting. Such ingredients may include but are not limited to polyethylene, polypropylene, polystyrene, acrylic resins, methyl cellulose, waxes, paraffins, and the like.

Prior art methodology for the extraction of such binders from green bodies generally involves the use of heat, often in conjunction with chemical leaching agents. Examples of such methods are thermal decomposition, solvation, evaporation, melt-wicking and the like.

These methods often take up much time since the rate of extraction of binder depends primarily on the thickness of the green body in an inverse linear relationship, i.e. the thicker the cross-section of the green body the longer it will take to extract the binder. Also, the rate of binder extraction is limited as a result of: (1) the generation of gaseous decomposition products and/or tensile forces throughout the binder (swelling), tending to disrupt the integrity of the green body, and (2) reduced extraction efficiency as degradation products build up within the green body or in the condensed solvent vapor or liquid solvent. The result is often the introduction of practical constraints for part wall thickness in order to keep the process economical as well as very flat temperature profiles.

It is therefore an object of this invention to provide an improved method of forming articles from sinterable materials. An equally important object of this invention is to provide an improved method for removing organic binder from a molded or compacted body from sinterable materials. It is a yet further object of this invention to provide a self-adjusting thermo-dynamically optimized and therefore energy-saving method for removing organic binder from a molded or compacted body from sinterable materials.

SUMMARY OF INVENTION

The above objects have been met with a method for removal of the binder from green bodies in a much speedier and more efficient manner by inducing an exothermic auto-oxidation reaction at the binder/atmosphere interface. The rate of this reaction is carefully and accurately controlled by the amount of heat energy supplied to the site of the decomposition reaction; the amount of oxygen available for reaction in the atmosphere and the rate of evacuation of the energy and decomposition products generated by the reaction.

BEST MODE FOR CARRYING OUT THE INVENTION

Figure 1:
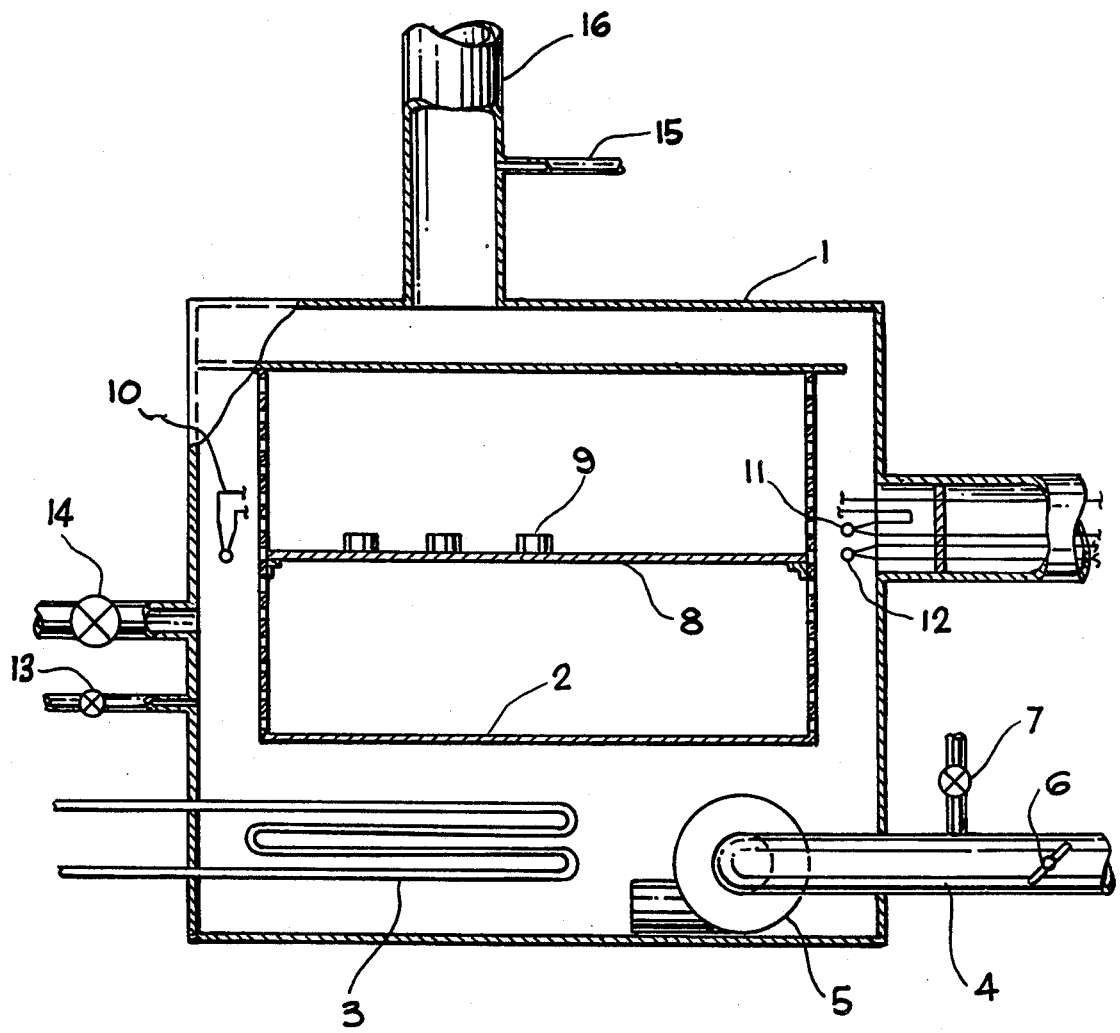
FIG. 1 is a plan view of apparatus used for practice of the method of the present invention.

The manufacture of molded articles from sinterable materials such as ceramic and metal powders is an economically attractive method for forming articles of commercial value due to its high production capacity and net or near-net shaping capability. Such manufacturing methodology usually includes the following sequential events.

First, there must be provided sinterable materials in particulate form. These sinterable materials usually comprise either metallic or ceramic materials. Metallic materials can be further divided into pure metals and metallic alloys. The sinterable materials should be available in particulate form. This is generally achieved by mechanically attriting and comminuting metal or ceramic raw materials to powder form of the desired size distribution. Metals can also be reduced to powder by atomization, during which a molten metal or metallic alloy is forced through a nozzle and dispersed into fine droplets which form a powder upon subsequent cooling. Glasses are generally included in the ceramics category. Mixtures of different categories are also possible, e.g. cements.

Second, the sinterable particulates must be formed into the desired configuration. This step requires the admixing of a binder to the particulate materials in order to produce a moldable mixture. Binders are either aqueous or organic, thermoplastic or thermosetting. Molding is generally performed in conventional plastics injection molding equipment although other forms of molding such as slip casting or doctor blading are also used commercially.

Third, substantially all of the binder must be extracted from the molded or "green" body. Whereas, this was previously generally achieved through thermochemical degradation of the binder with or without the use of chemical leaching agents, e.g. organic solvents, now a new method, described below is provided.

Fourth, the "stripped" or "de-waxed" body is sintered in the appropriate atmosphere and temperature in order to achieve the desired final density. During sintering, the individual particulates fuse together under the influence of surface activity of the particles, thereby gradually invading the open space left behind by the fugitive binder. The final geometry must therefore take into account the shrinkage which will inevitably occur upon sintering.

Thermal decomposition of polymers is essentially an endothermic process in which sufficient energy must first be provided to overcome the binding energies of the bonds between individual atoms (between 200 and 400 kJ/mol) and to provide any necessary activation energy. This activation energy varies widely from reaction to reaction and polymer to polymer, and in some systems, can be lowered considerably by the introduction or presence of suitable catalysts such as finely divided metal powder, free radical initiators and pigments e.g. cobalt blue or cadmium yellow.

It is well known that polymeric materials are thermodynamically unstable and may enter into in exothermic reactions under favorable conditions. While such reactions might be considered deleterious, this invention induces and utilizes these exothemic reactions for removal of organic binders from green bodies. These decomposition reactions are encouraged by high temperatures and are all the more violent the higher the pressure. For example, the thermochemistry of some of the possible reactions of polyethylene is interesting and shows reasons for the violence of the decomposition reactions. It will be sufficient to consider the heat effects and equilibria in two reactions (1) decomposition of polyethylene to carbon and hydrogen; (2) decomposition of polyethylene to carbon and methane.

The thermal effects and equilibria can be calculated from published tables of the properties of hydrocarbons with the results shown in Table 1.

The first column lists the reactions under consideration, the second column the heat evolved when the reaction proceeds from left to right at 227° C. at atmospheric pressure and the third column gives the corresponding free energy changes. When this free energy change is negative, the equilibrium is in favor of the right-hand side of the equation and, conversely, when it is positive the left-hand side is favored.

TABLE 1

| HEAT EFFECTS AND EQUILIBRIA OF POLYETHYLENE | | | | |
|---|---|---|---|---|
| | | | k cal/mole C2H4 @ 227° C. | |
| Reaction | | | Heat of reaction (−delta H) | Free energy change delta F |
| 1/n(C2H4)n polymer gas | <=> | 2C + 2H2 sol. gas | −11.01 | −13.764 |
| 1/n(C2H4)n | <=> | C + CH4 | 8.29 | −21.605 |

TABLE 1-continued

| HEAT EFFECTS AND EQUILIBRIA OF POLYETHYLENE | | |
|---|---|---|
| | k cal/mole C2H4 @ 227° C. | |
| Reaction | Heat of reaction (−delta H) | Free energy change delta F |
| polymer gas    sol. gas | | |

It can be seen that the polymer is thermodynamically unstable with respect to carbon and methane by an exothermic reaction.

Reaction rate will depend on the factors which promote chemical re-arrangement. One of the most potent of these is elevated temperature; the breakdown of hydrocarbons proceeds rapidly at high temperatures. This knowledge, and the data of the table, make it understandable that, such is the exothermicity of the system, that unless great care is taken to avoid an uncontrolled temperature rise there is serious risk of reaching temperatures which will induce the hydrocarbon decomposition reactions, and that these, being themselves exothermic, once induced, will accelerate both because of temperature rise (thermal feedback) and by the branched chain reactions of the decomposition.

The temperatures at which hydrocarbons will decompose also depend on the availability of oxygen or other oxidizing agents. Pyrolysis is the irreversible chemical decomposition due to an increase in temperature without oxidation. Table 2 gives the pyrolytic decomposition range for some common plastics.

TABLE 2

| PYROLYTIC DECOMPOSITION RANGE OF COMMON PLASTICS | |
|---|---|
| Plastic | Decomposition range (°C.) |
| Polyethylene | 340–440 |
| Polypropylene | 320–400 |
| Polystyrene | 300–400 |
| Polyvinyl chloride | 200–300 |
| PTFE | 500–550 |
| Polymethyl methacrylate | 180–280 |
| Polyacrylonitrile | 250–300 |
| Polyamide 6 | 300–350 |
| Polyamide 66 | 320–400 |

For example, in the absence of oxygen polyethylene remains unaffected up to about 300° C. at which time it starts to degrade pyrolytically or "crack." In the presence of oxygen however, thermal degradation sets in at about 150° C. or even lower if the oxygen concentration in the atmosphere is artificially raised above that of air. The probability of entering into an exothermic condition will be dramatically increased, and will be somewhat unavoidable, provided the temperature is sufficiently high and enough oxygen is present.

Polypropylene undergoes thermal degradation more easily than polyethylene particularly when oxygen is present.

Most of the mechanisms of thermo-oxidative degradation of polymers have been attributed to either chain scission of the polymer and the formation of some type of intermediate free radical species or an attack by molecular oxygen on the polymer linkages. Studies of the effect of polymer cross-linking on degradation reactions showed that polymers having no cross-linking generally underwent scission of the chain structure and were completely volatilized whereas cross-linked polymers tend to carbonize and leave residues of degradation under the same conditions.

In polyolefins the decomposition reactions can be represented as follows:

$$RH \rightarrow R^* + H^* \quad (1)$$

$$R^* + O_2 \rightarrow ROO^* \quad (2)$$

$$ROO^* + RH \rightarrow ROOH + R^* \quad (3)$$

$$ROOH \rightarrow RO^* + {}^*OH \quad (4)$$

The radical R formed in equation (1) reacts with oxygen to give ROO* (2) which, together with further polyolefin forms hydroperoxide (3).

In the branching step the hydroperoxide decomposes to give RO* and the highly reactive species *OH (4). These radicals cause degradation and give rise to various decomposition products depending on the constitution of the polymer.

Almost exclusively gaseous products are formed with some polymers, e.g. the depolymerization of polymethyl acrylate results in the formation of over 90% monomer and the degradation of polyethylene leads to the formation of saturated and unsaturated hydrocarbons.

Infrared analysis of polyethylene combustion gases shows carbon dioxide, carbon monoxide and methane to be present along with bands due to C-H links, alcohols, hydroxyl, carbonyl and carboxyl groups. It has been reported (Isenberg, 1964) that the mass loss of a plastic material undergoing degradation occurred primarily at the surface.

As with the candle flame, the temperature of the bulk of the polymer is considerably lower than that of the polymer/atmosphere interphase where reaction with oxygen occurs. No precise values for the temperature at the reaction site have been reported in the literature thus far, but when exothermic reactions are left uncontrolled, very high temperatures are generated and can result in sintering of the particulate materials at the polymer/atmosphere interface. This clearly shows that temperatures as high as 800° C. and more can be reached in a short time. When the reactions are controlled at the time of their onset, as is the case in the present invention, decomposition gases as well as the heat of reaction generated at the interphase can easily diffuse through the open porosity created by the invading reaction front and are rapidly diluted by the circulating atmosphere.

Referring now to FIG. 1, a convenient apparatus for the process is provided by a laboratory drying oven or reactor 2 within a housing 1 having laminar forced air circulation through an air inlet pipe 4, air blower 5, and exhaust 16 and automatic temperature control. An air inlet control valve 6 controls the air flow rate to the blower, while an oxygen inlet control valve 7 controls oxygen flow for oxygen enrichment. An inert gas control valve 13 controls added inert gas and an emergency inert gas valve 14 is added for safety. A dewpoint measuring gauge 15 is used in the air exhaust flow path to sense occurrence of an exothermic reaction. The oven is equipped with two fast-response thermocouples connected in series opposition such as is commonly found in Differential Thermal Analysis (DTA) equipment. The first thermocouple 10, TC1, is mounted in a convenient location immediately upstream of the payload 9. The second thermocouple 11, TC2, is placed immediately downstream of the payload 9 and as close to said payload as possible.

TC1 is connected in series with TC2 forming a differential couple. A third thermocouple 12, TC3 is disposed nearby as a reference thermocouple. As the reactor is heated by heating elements 3, there is no output from the series couples until either an endothermic or an exothermic reaction takes place in the payload. In the first case the absorbed heat results in lower temperature at the location of TC2. In the second case a higher temperature will be sensed by couple TC2, with a resultant reversed polarity in the signal from the differential couple, TC1-TC2. An amplifier is used for increasing the small thermocouple signals to the millivolt level which can then be digitally displayed and/or recorded. The record obtained using this apparatus shows the heat absorbed (from an endothermic reaction) or liberated (from an exothermic change) and can be plotted against the temperature of reference thermocouple TC3 which is usually the one used to control the power to the heating elements of the oven and which should ideally be placed downstream and as close as possible to the payload, in other words, near TC2. The sensitivity achievable by an installation such as the one described above is generally within 0.5° C.

A safety installation is provided through a source of pressurized inert gas, e.g. argon or nitrogen, the supply of which is activated by a solenoid valve 13 controlled by the differential thermocouple. An emergency safety device consists of another solenoid valve 14 which is activated when a predetermined critical temperature differential is reached and allows for bulk flooding of the process chamber with the inert atmosphere.

Green bodies 9 are stacked on a shelf 8 or on several shelves of the oven in open trays so as to maximize airflow over and around them. The temperature of the oven is controlled to rise rapidly to the point above that where the binder or its constituents attain their activation energies. Degradation of the binder is preferably carried out as closely as possible to the exotherm of the binder.

As soon as an exothermic condition manifests itself through a reversal in polarity of the temperature power to the heating elements is shut off. There being no further supply of heat to the reaction and, with the rapid dilution of the already generated heat of reaction in the now unheated circulating airflow, the temperature at the site of reaction will quickly drop to a level at which the exothermic reaction cannot be sustained and the temperature differential will return to zero. If the power cut is insufficient to restore the temperature differential to zero, the air inlet valve will be closed to shut off the supply of fresh air and the solenoid valve on the inert gas supply will simultaneously be activated, thereby rapidly reducing the level of oxygen available for combustion. In addition the expanding inert gas, by its cooling action, will assist in reducing the activation energy of the polymer and thereby bring the exothermy under control.

When the temperature differential is restored to zero the solenoid valve on the inert gas is deactivated. Temperature is now maintained between 300° and 400° C., or whichever temperature is judged convenient. Substantially all binder will have been removed from the green body which can now be sintered under the appropriate conditions of prior art practice.

EXAMPLE I

A batch of 1500 green parts, each weighing about 20 grams, was obtained by injection molding a mixture consisting of 50% iron carbonyl powder with an average particle size of 3-5 micrometer, 25% high density polyethylene with a melt index of 20 and 25% of paraffin wax. The parts were placed on flat trays which were loaded into a clean stainless steel laboratory drying oven of 8 dm3 capacity and equipped with an air blower delivering approximately 1.7 m3/hr of internal air circulation. An automatic control valve on the fresh air inlet to the blower reduced the airflow whenever maximum power to the heating elements was insufficient to maintain the temperature profile.

The oven temperature was set to rise to 150° C. at the maximum rate the oven was capable of. During this time the fresh air inlet to the blower was reduced. After about 20 minutes thermocouple TC3 indicated 150° C. and the heating rate was changed to 100° C./hr. During a second temperature ramp, the temperature differential between thermocouple TC1 and thermocouple TC2 was virtually constant at +2° C. When the temperature of the oven (TC3) reached 193° C. the temperature differential suddenly changed sign to −3° C. indicating the onset of an exothermic reaction. Power to the heating elements was shut off as the oven temperature exceeded the call. An automatic dewpoint measuring instrument 15 had been mounted on the exhaust of the oven and showed a marked rise in dewpoint indicating that the exothermic reaction was generating moisture as a by-product. For approximately three quarters of one hour the temperature differential remained positive and the oven elements were not energized. After this the temperature differential was sometimes positive and sometimes negative with corresponding injections of power to the heating elements. After a period of about three and one half hours from the time the run had been started the temperature differential remained slightly negative and the temperature of the oven reached 300° C. after four hours. The power was then shut off and the parts, after cooling, were transferred to a sintering furnace and sintered under a reducing atmosphere to full density.

EXAMPLE II

A batch of 3000 green parts, each weighing about 22 grams, was obtained by injection molding a mixture consisting of 25% iron carbonyl powder with an average particle size of 3-5 micrometer, 25% nickel carbonyl powder with an average particle size of 7-10 micrometers, 25% polypropylene and 25% of carnauba wax. The parts were placed on rimmed trays and loaded as before onto the shelves of the above described drying oven.

The oven was set to heat up at maximum power until 200° C. When thermocouple TC3 indicated a temperature of 182° C. a violent exothermic reaction took place which caused a rapid negative temperature differential. In addition to a power cut, which was made to occur instantaneously upon reversal of the polarity of the temperature differential, the emergency supply of argon came on, when the temperature differential reached −10° C. The oven temperature continued to rise to a value of about 225° C. and then slowly fell back to 182° C. when the emergency argon supply was shut off. From that time onwards only intermittent bursts of argon were injected into the oven chamber as well as of, occasionally, electrical power to the heating elements for the rest of the run. Oven temperature progressed to 280° C. then rose to an end point of 350° C. Upon inspection of the payload after cooling all parts were found to be intact and could subsequently be sintered to final density.

EXAMPLE III

A batch of 3000 green parts, each weighing about 6 grams, was obtained by injection molding a mixture consisting of 50% fine alumina powder with an average particle size of 0.5 micrometers, 25% polymethylmethacrylate, 24.5% paraffin wax, 0.3% benzoyl peroxide and 0.2% cobalt blue. The parts were again placed on flat trays and loaded into the stainless steel laboratory drying oven equipped and programmed as described above. About 8 l/min (0.5 m3/hr) of oxygen was injected into the blower air inlet. An exothermic reaction was observable at approximately 150° C. The reaction generated sufficient heat to allow for the power to the heating elements to be off for approximately forty minutes. After the exothermy, the furnace and the run was completed under endothermic conditions.

I claim:

1. A method of producing an article from sinterable particulates whereby binder material is removed from a molded configuration prior to firing, comprising the steps of:
    (1) mixing together predetermined amounts of sinterable particulates and an organic binder at a temperature above the melting point of the binder whereby a mixture is formed wherein said binder covers substantially all of the surface of said sinterable particulates,
    (2) forming said mixture into a desired configuration,
    (3) rapidly increasing the temperature of said configuration in an oxygen bearing atmosphere to a temperature where said binder will enter into a reaction to cause exothermic degradation,
    (4) detecting and then limiting said exothermic degradation by controlling the amount of heat and oxygen furnished to the reaction whenever exothermic degradation is initiated,
    (5) continuing heating until substantially all of said binder is removed from said configuration, and
    (6) sintering said configuration.

2. The method of claim 1 wherein said sinterable particulates are selected from the group consisting of metal and metal alloys, ceramics, glasses and mixtures thereof.

3. The method of claim 1 wherein the binder comprises organic materials which are degradable by exothermal oxidation.

4. The method of claim 1 wherein the oxygen concentration of the circulating atmosphere is enriched above the oxygen concentration of air.

5. The method of claim 1 wherein degradation of the binder is performed as closely as possible to the exotherm of the binder.

6. A method of removing fugitive organic binders from a molded or compacted green body of sinterable particulates comprising,
    (a) heating a green body article in an oxygen bearing atmosphere, the green body article having sinterable particulates in an organic binder, then
    (b) detecting exothermic reactions in said green body article at the interface of said green body article and said oxygen bearing atmosphere, than (c) quenching said exothermic reactions, then
(d) repeating steps (a)–(c) until the exothermic reactions of step (b) are no longer detected after the heating of step (a).

7. The method of claim 6 further defined by introducing oxygen beyond the oxygen content of air in said atmosphere during said heating step.

8. The method of claim 6 further defined by flowing said oxygen bearing atmosphere relative to the green body article.

9. The method of claim 6 wherein said quenching is achieved by reducing heating of said article.

10. The method of claim 6 wherein said quenching is achieved by displacing said oxygen bearing atmosphere with an inert atmosphere.

11. The method of claim 6 wherein said quenching is achieved by reducing heating of said article and displacing said oxygen bearing atmosphere with an inert atmosphere.

12. A method of removing fugitive organic binders from a molded or compacted green body of sinterable particulates comprising,
(a) heating a green body article in an oxygen bearing atmosphere, the green body article having sinterable particulates in an organic binder, said heating progressing at a rate for the purpose of initiating exothermic degradation of said organic binder, then detecting the attainment of exothermic degradation of said organic binder, then
(b) cooling said green body after attaining the exotherm of said organic binder, said cooling halting said exothermic degradations,
(c) repeating steps (a) and (b) until exothermic reactions no longer occur in said green body article.

13. The method of claim 12 further defined by introducing oxygen beyond the oxygen content of air in said atmosphere during said heating step.

14. The method of claim 12 further defined by flowing said oxygen bearing atmosphere relative to the green body article.

15. The method of claim 12 wherein said cooling is achieved solely by reducing heating of said article.

16. The method of claim 12 wherein said cooling is achieved by displacing said oxygen bearing atmosphere with an inert atmosphere.

17. The method of claim 12 wherein said cooling is achieved by reducing heating of said article and displacing said oxygen bearing atmosphere with an inert atmosphere.

18. A method of producing an article from sinterable particulates whereby binder material is removed from a molded configuration prior to firing, comprising the steps of:
(1) mixing together predetermined amounts of sinterable particulates and an organic binder at a temperature above the melting point of the binder whereby a mixture is formed wherein said binder covers substantially all of the surface of said sinterable particulates,
(2) forming said mixture into a desired configuration,
(3) rapidly increasing the temperature of said configuration in an oxygen bearing atmosphere to a temperature where said binder will enter into a reaction to cause exothermic degradation, said oxygen bearing atmosphere being provided by a fluid flow of gaseous oxidant from a downstream position and in an upstream direction,
(4) limiting said exothermic degradation by controlling the amount of heat and oxygen furnished to the reaction whenever the initiation of exothermic degradation is detected by the occurrence of measuring the temperature at a location in close proximity to the configuration on a downstream side thereof as exceeding the temperature measured closely proximate the configuration at a side upstream relative to said fluid flow of gaseous oxidant,
(5) continuing heating until substantially all of said binder is removed from said configuration, all
(6) sintering said configuration.

19. The method of claim 18 wherein oxygen concentration is reduced when the initiation of exothermic degradation is detected.

* * * * *

UNITED STATES PATENT AND TRADEMARK OFFICE
CERTIFICATE OF CORRECTION

PATENT NO. : 4,795,598

DATED : January 3, 1989

INVENTOR(S) : Romain L. Billiet

It is certified that error appears in the above-identified patent and that said Letters Patent is hereby corrected as shown below:

Column 3, line 37, "exothemic" should read - - exothermic - -.

Claim 6, column 8, line 68, "than" should read - - then - -.

Claim 18, column 10, line 37, "all" should read - - and - -.

Signed and Sealed this

Thirteenth Day of February, 1990

*Attest:*

JEFFREY M. SAMUELS

*Attesting Officer*   *Acting Commissioner of Patents and Trademarks*